(12) United States Patent
Beale et al.

(10) Patent No.: US 10,738,445 B2
(45) Date of Patent: Aug. 11, 2020

(54) WATER SUPPLY SYSTEM

(71) Applicant: WALLGATE LIMITED, Wilton (GB)

(72) Inventors: David Joseph Anthony Beale, Salisbury (GB); Richard Edward Denbury, Pewsey (GB)

(73) Assignee: Wallgate Limited, Salisbury Wiltshire (GB)

( * ) Notice: Subject to any disclaimer, the term of this patent is extended or adjusted under 35 U.S.C. 154(b) by 0 days.

(21) Appl. No.: 16/099,981

(22) PCT Filed: May 11, 2017

(86) PCT No.: PCT/GB2017/051313
§ 371 (c)(1),
(2) Date: Nov. 8, 2018

(87) PCT Pub. No.: WO2017/194948
PCT Pub. Date: Nov. 16, 2017

(65) Prior Publication Data
US 2019/0127959 A1 May 2, 2019

(30) Foreign Application Priority Data

May 13, 2016 (GB) .................... 1608486.5

(51) Int. Cl.
*E03C 1/05* (2006.01)
*E03C 1/04* (2006.01)
*F16K 21/14* (2006.01)

(52) U.S. Cl.
CPC ............... *E03C 1/055* (2013.01); *E03C 1/04* (2013.01); *F16K 21/14* (2013.01); *Y10T 137/9464* (2015.04)

(58) Field of Classification Search
CPC ............... E03C 1/055; Y10T 137/9464; Y10T 137/86389
(Continued)

(56) References Cited

U.S. PATENT DOCUMENTS 3,638,680 A * 2/1972 Kopp .................... E03C 1/05
137/606
3,929,317 A * 12/1975 Cohn .................... F16K 31/60
251/223

(Continued)

FOREIGN PATENT DOCUMENTS

CN 105605294 A 5/2016
DE 3908693 A1 11/1989
(Continued)

OTHER PUBLICATIONS

International Search Report for Corresponding PCT/GB2017/051313 dated Sep. 1, 2017.
(Continued)

*Primary Examiner* — Robert K Arundale
(74) *Attorney, Agent, or Firm* — Sandberg Phoenix & von Gontard, P.C.

(57) ABSTRACT

There is provided a water supply control system for a tap (2). The control system includes a spindle (16) attached at one end to a tap handle (10) and at its other end to a tap rotation detector/valve actuator, the spindle (16) extending through the water supply conduit (3) to a tap rotation detector (5) which sends a signal to a supply valve (4) via a controller (6). The controller (6) triggers closure of the valve (4) if the valve has remained open for a predetermined time interval. The control system also has a detent to limit rotation of the spindle (16) in a tap closing direction.

12 Claims, 5 Drawing Sheets

(58) Field of Classification Search
USPC .......................................... 251/284, 286, 288
See application file for complete search history.

(56) References Cited

U.S. PATENT DOCUMENTS

| | | | | |
|---|---|---|---|---|
| 4,064,904 | A * | 12/1977 | Tolnai | F16K 31/508 137/454.5 |
| 6,003,170 | A * | 12/1999 | Humpert | E03C 1/057 251/129.03 |
| 2008/0111090 | A1 * | 5/2008 | Schmitt | E03C 1/05 251/129.03 |
| 2008/0271238 | A1 * | 11/2008 | Reeder | A46B 7/04 4/597 |
| 2010/0206956 | A1 * | 8/2010 | Gautschi | E03C 1/055 236/12.12 |
| 2011/0005627 | A1 * | 1/2011 | Kanemaru | E03C 1/055 137/801 |
| 2013/0014844 | A1 * | 1/2013 | Davidson | E03C 1/055 137/625.41 |
| 2014/0359935 | A1 * | 12/2014 | Veros | E03C 1/055 4/677 |
| 2018/0216324 | A1 * | 8/2018 | Beck | E03C 1/0412 |

FOREIGN PATENT DOCUMENTS

| | | |
|---|---|---|
| DE | 10320636 B3 | 2/2005 |
| EP | 0432440 A1 | 6/1991 |
| EP | 2264252 A1 | 12/2010 |

OTHER PUBLICATIONS

Written Opinion for Corresponding PCT/GB2017/051313 dated Sep. 1, 2017.
Search Report for corresponding application No. GB1608486.5 dated Nov. 1, 2016.
Search Report for corresponding application No. GB1707553.2 dated Oct. 12, 2017.

* cited by examiner

WATER SUPPLY SYSTEM

CROSS-REFERENCE TO RELATED APPLICATIONS

This application is the US National Stage under 35 USC § 375 of, and claims priority to, PCT/GB2017/051313 filed May 11, 2017, which in turn claims priority to British App. No. 1608486.5 filed May 13, 2016. Both of said applications are incorporated herein by reference.

FIELD OF THE INVENTION

The present invention relates to an improved water supply system and to an improved method for controlling the supply of water to sanitary ware including sinks, basins and baths etc. The present invention is particularly suited, but not exclusively, to care homes for the elderly and facilities used by those suffering impairment of their mental processes such as, but not limited to, dementia.

BACKGROUND OF THE INVENTION

Water supply control systems have been developed to restrict the quantity of water delivered from a faucet or tap (generally referred to herein as a "tap") in a single usage event. Such water supply control systems have also been used to prevent or restrict unattended outflow of water from taps. However, such water supply control systems tend to be complex and expensive to install and use. For example, in U.S. Pat. No. 6,003,170 a water supply control system is described comprising a mixer tap in the form of a single lever in combination with two separate electrically powered sensors and a controller. One of the sensors is mounted in the cap of the lever tap to detect mechanical movement of the lever and a second sensor is mounted on the underside of the tap to remotely detect physical presence of a user and electrical connections extend between each of the sensors and the controller. In addition, the hot and cold water supplies are fed to a mechanical mixer valve in the cap of the tap. The outlet of the mechanical mixer valve feeds a separate solenoid valve, mounted some distance away from the mechanical valve below the tap, and from the solenoid valve back up into the tap to the tap outlet.

A further problem with conventional water supply control systems arises from the fact that people who suffer from dementia or other forms of impairment of their mental processes can find it difficult to operate the tap or taps. Proper operation of remote sensors, in particular, can be difficult to comprehend for those suffering from impaired mental processes and so they can become confused when water does not start to flow out from a tap that they think they have turned on. As a result the adoption of water supply control systems in the care home environment and in facilities used by those suffering impairment of their mental processes can have the unfortunate effect of making residents/patients reliant upon staff for assistance.

SUMMARY OF THE INVENTION

The present invention seeks to address the problems discussed above with conventional water supply control systems. The present invention also seeks to provide a water supply control system and a water supply system that is suited, but not exclusively, for use in care homes and in facilities used by those suffering from impairment in their mental processes. The present invention further seeks to provide a water supply control system and a water supply system that may be retro-fitted to a conventional tap. In addition the present invention seeks to provide a method of retro-fitting a water supply control system to existing sanitary ware.

The present invention therefore provides a water supply control system for use with a water tap, the water supply control system comprising: a spindle arrangement adapted for exposure to water during use, the spindle arrangement incorporating a spindle having a first end, a second end and a portion intermediate the first and second ends, the first end region of the spindle being adapted for rotation with a water tap handle and including means for connection to the handle of a water tap; a tap rotation detector adapted to identify the direction of rotation of the spindle remote from said first end region; a valve adapted to control the flow of water to the water tap; and a controller in communication with the tap rotation detector and the valve, wherein the controller is adapted to trigger closure of the valve when the valve has remained open for a predetermined time interval, the water supply control system further comprising a detent adapted to limit rotation of the spindle in a tap closing direction.

The water supply control system of the present invention is adapted to stop the flow of water out of the tap if the tap is abandoned in its 'on' position whilst ensuring that, from the perspective of the user, the look and feel of the tap connected to the water supply control system and its manner of use is familiar. In effect, the underlying electronic control of the supply of water through the tap is substantially invisible to a user. Moreover, the water supply control system of the present invention avoids many of the complexities of known water supply control systems.

Ideally the spindle arrangement extends through a portion of a supply conduit which supplies water to the tap. This enables the water supply control system to be compact and to fit within the envelope of the existing tap and associated pipework.

The tap rotation detector may include one or more movable contacts and the second end of the spindle may include a cam which acts upon the one or more movable contacts. Also, the water supply control system may include two or more contact sensors each of which detects contact with at least one of the one or more movable contacts. Ideally each contact sensor is a micro-switch.

Alternatively the tap rotation detector may include a rotary encoder for identifying the direction of rotation of the spindle.

It is preferred that the controller is adapted to trigger the opening of the valve for a cleansing purge independently of any detected rotation of the spindle.

In an alternative aspect the present invention provides a water supply system including a water supply control system as described above, a tap and a basin, sink, bath or shower.

In a preferred embodiment of the water supply system the tap rotation detector is mounted below the surface of the basin, sink, bath or shower on which the tap is mounted.

In a further aspect the present invention provides a method of installing a water supply control system to the tap of an existing water utility, the method comprising the steps of:
 a. removing the mechanical valve in the tap of the existing water utility;
 b. attaching a first end of the spindle of the water supply control system to a handle of the tap;
 c. extending the spindle arrangement through pipework which supplies water to the tap;

d. positioning the tap rotation detector below the surface of the water utility on which the tap is mounted so as to detect the direction of rotation of a portion of the water compatible spindle remote from its first end; and
e. installing the valve in the pipework which supplies water to the existing water utility such that there is an open water circuit between the valve and an outlet of the tap.

Thus, with the present invention the water supply control system is simply and easily retro-fitted to existing conventional taps and sanitary ware.

BRIEF DESCRIPTION OF THE DRAWINGS

Embodiments of the present invention will now be described with reference to the accompanying drawings, in which.

It is to be understood that the illustrated components in each figure are approximately to scale, however, the scale differs between the figures.

DETAILED DESCRIPTION OF A PREFERRED EMBODIMENT

Figure 1:
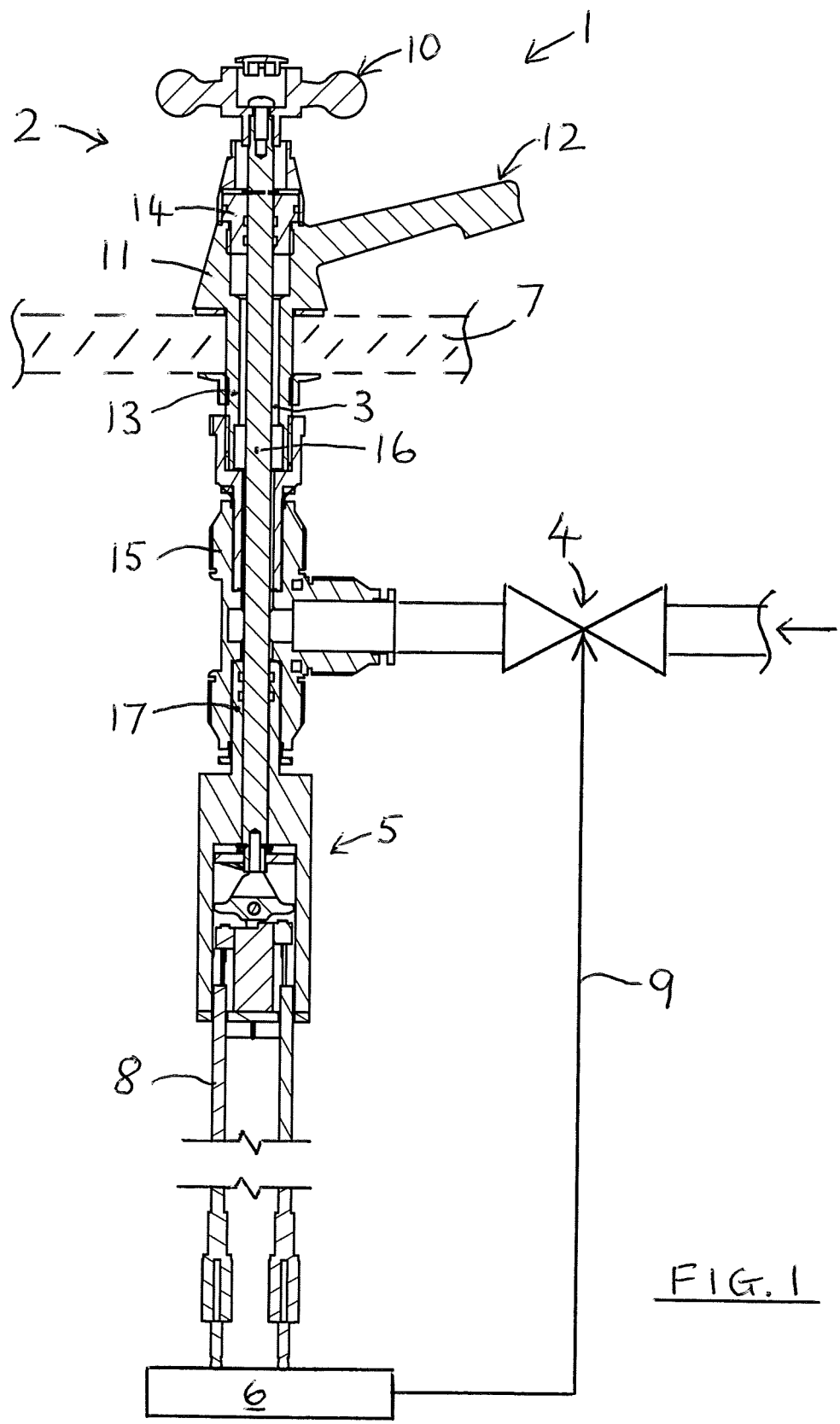
FIG. 1 is a schematic diagram of a water supply system in accordance with the present invention including a cross sectional view of the tap and the valve actuator of the water supply system.

A water supply system 1, suitable for use in care homes and other facilities used by people with impaired mental processes, is shown in FIG. 1. The water supply system 1 generally comprises a tap 2, connected to a water conduit 3, a valve 4 which controls the flow of water along the conduit 3 to the tap 2, a valve actuator 5, and a controller 6. The water supply system 1 is adapted for use with conventional sinks, baths and other sanitary ware 7 (generally referred to herein as basins) with the tap 2 mounted on the top surface of the basin 7 or its surround. The water conduit 3 extends through a hole in the basin 7 or its surround and the valve 4, valve actuator 5 and controller 6 are mounted below the top surface of the basin 7. The valve actuator 5 is in wired or wireless communication 8 with the controller 6. The valve 4 is in wired or wireless communication 9 with either or both of the valve actuator 5 and the controller 6.

Where the basin 7 includes a tap aperture through which the water conduit 3 extends, conventionally the basin 7 will include a plumber's cavity (not illustrated) below the tap aperture(s) in the top surface of the basin 7 that opens towards the sides or rear of the basin 7. The valve actuator 5 is sized to fit within such a conventional plumber's cavity.

The tap 2 is preferably conventional in design comprising a handle 10, a casing 11, and a spout or outlet 12 which is in fluid communication with the interior of the casing 11. The handle 10 of the tap is mounted to the casing 11 and is capable of rotational movement relative to the casing 11. Preferably the handle 10 includes a plurality of radially extending knobs to make the handle 10 easier to grip even by those who are frail. The handle 10 may be, but is not limited to, a cross head Victorian style of handle. The tap tail 13 is sized to fit within the tap aperture in the basin 7 or its surround so that the casing 11 sits on the upper surface of the basin 7 or its surround.

A first plug 14 is mounted within the tap casing 11 to isolate the handle 10 from water flowing through the tap to the spout 12. Below the plug 14 the interior of the tap tail 13, the casing 11 and the spout 12 form the upper end of the water conduit 3. The lower end of the water conduit 3 comprises conventional water pipework including a T-junction water inlet 15. The T-junction water inlet 15 is in fluid communication with a water supply (not shown) via the valve 4. Thus the water flow circuit between the valve 4 and the tap spout 12 is completely open. The valve 4 is a conventional solenoid valve suitable for use with water supplies, although the valve 4 may be one of many known types, and it is envisaged that particularly good results would be obtained using a proportional solenoid valve.

The system 1 incorporates a spindle arrangement comprising a spindle in the form of a drive rod 16. The upper end of the drive rod 16 is journaled to the tap handle 10 so that the drive rod 16 is turned in response to rotation of the tap handle 10. From its upper end the drive rod 16 extends through the first plug 14, along and within the water conduit 3, past the T-junction water inlet 15 to a second plug 17. Thus, water flowing within the water conduit 3 flows around and past the drive rod 16. The drive rod 16 extends through the second plug 17 and terminates at its lower end in the valve actuator 5. The second plug 17 seals off the fluid path below the T-junction water inlet 15 so that the lower end of the drive rod 16 and the valve actuator 5 are isolated from water flowing within the water conduit 3.

Figure 2:
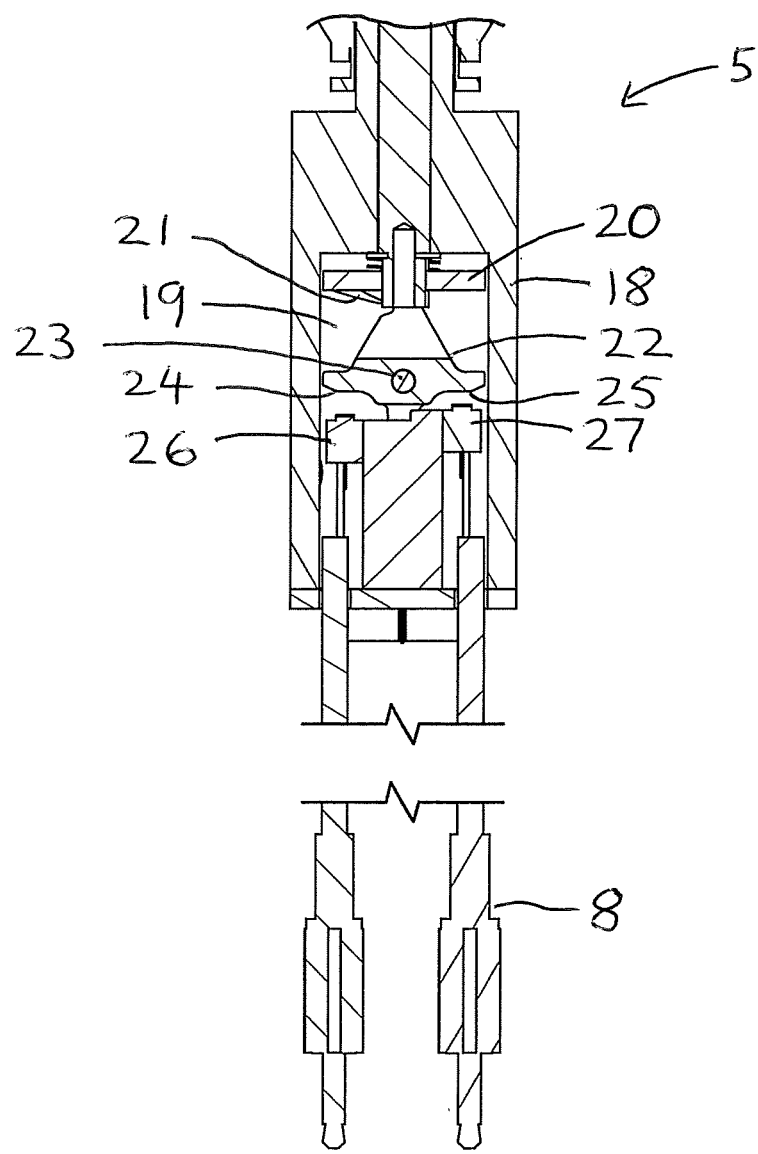
FIG. 2 is an enlarged cross-sectional view of the valve actuator of FIG. 1.
Figure 3:
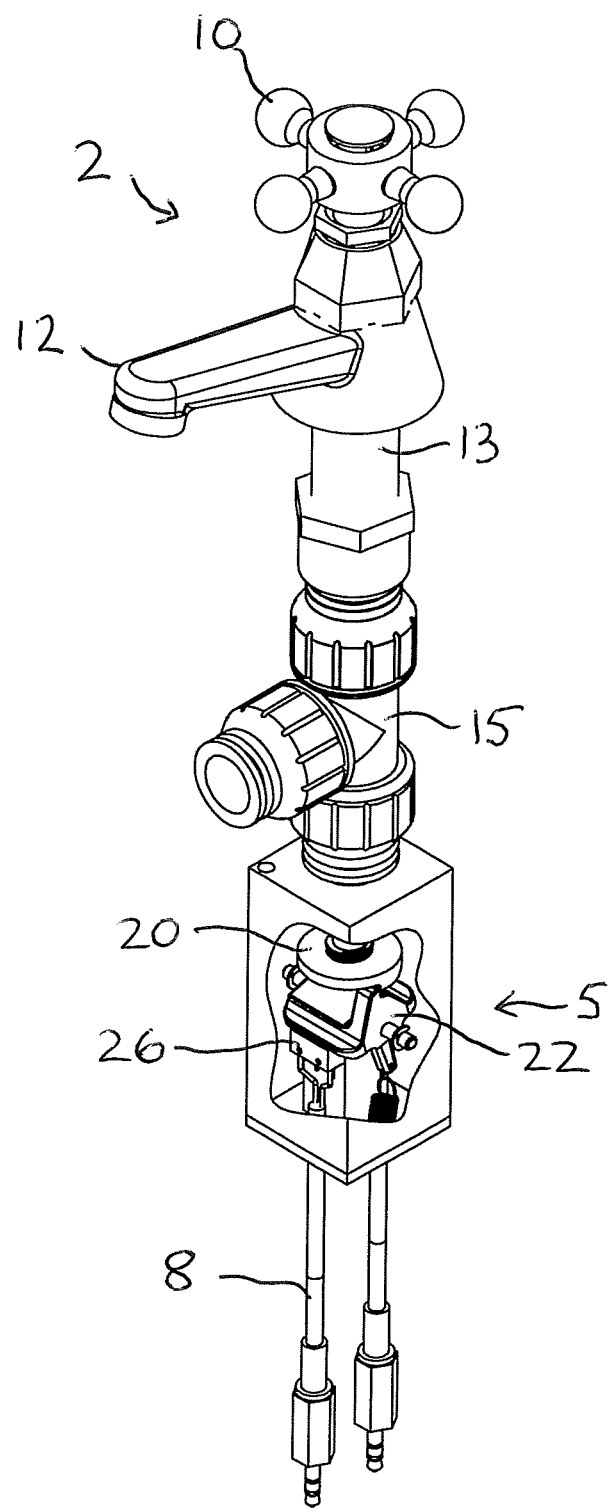
FIG. 3 is a cut-away perspective view of the tap and the valve actuator of FIG. 1.
Figure 4:
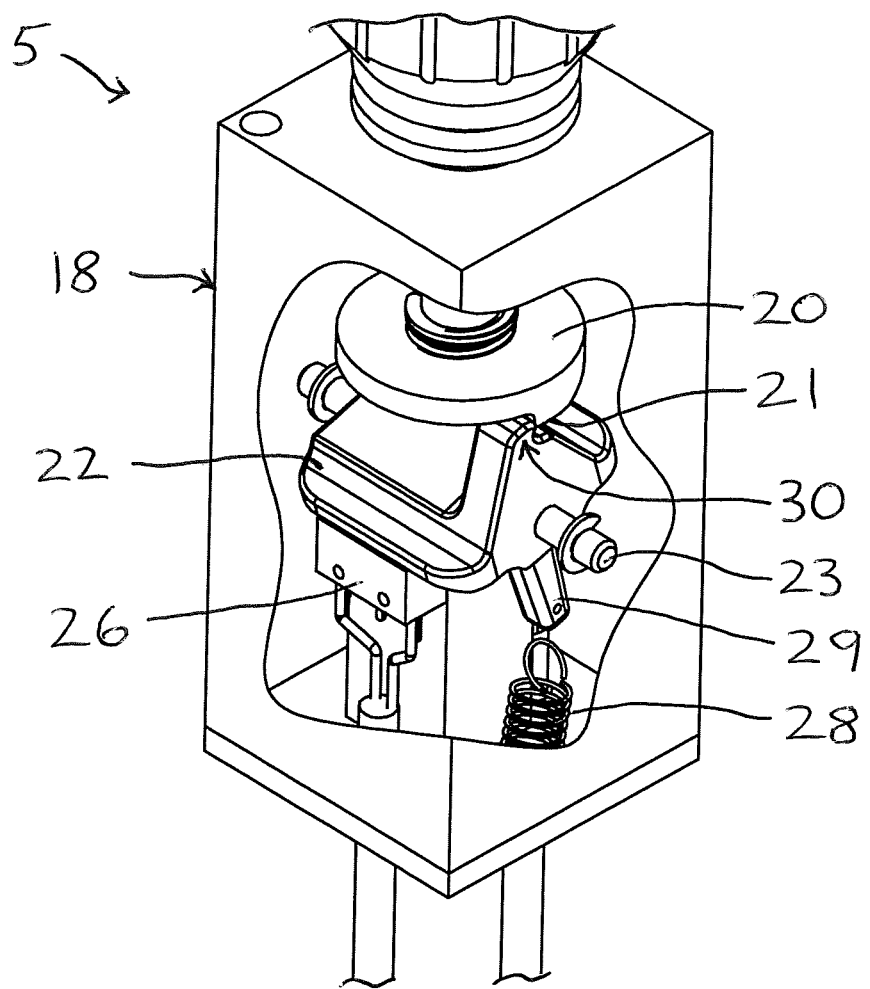
FIG. 4 is an enlarged cut-away perspective view of the valve actuator of FIG. 1.

The valve actuator 5 may be more clearly seen in FIGS. 2 and 4. The valve actuator 5 comprises a housing 18 having a cavity 19. The lower end of the drive rod 16 is rotatably mounted within the cavity 19 and includes a radially extending disk 20 with a cam 21 on its underside. Also within the cavity 19 is a rocker 22 mounted on a pivot bar 23, arranged orthogonal to the main axis of the drive rod 16, which permits the rocker 22 to turn about the pivot bar 23 in a rocking motion driven by contact between the rocker 22 and the cam 21 of the drive rod 16. The rocker 22 includes a pair of contact surfaces 24, 25 aligned with and facing towards first and second micro-switches 26, 27. Rocking movement of the rocker 22 results in one or other of the contact surfaces 24, 25 coming into contact with their respective micro-switches 26, 27. A spring 28 is provided to bias the rocker 22 towards a position in which neither contact surface 24, 25 is in contact with its respective micro-switch 26, 27. As shown in FIG. 4, the spring 28 is attached at one end to the valve actuator housing 18 and at the other end to an axially extending finger 29.

The micro-switches 26, 27 preferably meet regulatory requirements for SELV (Safety Extra Low Voltage) and an example of a suitable micro-switch is the D2FS-F-N ultra subminiature switch from Omron®. The micro-switches 26, 27 may receive power via, for example jack plug connections, from the controller 6. However the micro-switches 26, 27 are also capable of being battery powered.

In use, anti-clockwise rotation of the handle 10 by a user causes corresponding rotation of the drive rod 16 and the disk 20. The rocker 22, which acts as a follower against the cam 21 of the disk 20, pivots in a first direction in response to rotation of the disk 20. The pivoting of the rocker 22 lowers one of the contact surfaces 24 into physical contact with its corresponding micro-switch 26. Contact between the contact surface 24 and the micro-switch 26 sends a signal to the controller 6 that the tap has been turned on by the user. In response the controller 6 sends a signal to the valve 4 to open the valve and thereby allow water to flow past the valve through the water conduit to the tap spout 12. Further rotation of the tap handle 10 by the user is possible but does not result in any change to the flow of water from the tap spout 12.

Subsequent clockwise rotation of the tap handle 10 by the user to 'close' the tap, results in the rocker 22 pivoting in a second direction, opposite to the first direction. The pivoting of the rocker in the second direction breaks the contact between the contact surface 24 and the micro-switch 26 and instead causes contact between the contact surface 25 and the micro-switch 27. This contact between the contact surface 25 and the micro-switch 27 sends a signal to the controller 6 that the tap has been turned off by the user. In response the controller 6 sends a signal to the valve 4 to close the valve and thereby halt the flow of water to the tap spout 12.

As may be seen in FIG. 4, the rocker 22 includes a detent or stop 30 which engages with the cam 21 when the drive rod 16 is rotated clockwise. Engagement between the cam 21 and the stop 30 prevents further clockwise rotation of the drive rod 16 and so also prevents further clockwise rotation of the tap handle 10. In this way, the user experiences a familiar restriction to continued clockwise rotation of the tap handle when the tap handle has been moved to its closed position.

When the tap is turned on by the user, in addition to issuing a signal to the valve 4 to open the controller 6 also triggers the start of a timer which monitors the duration of time the valve 4 remains open. If the valve remains open for a period of timing equaling or exceeding a predetermined time interval, e.g. 3 mins, the controller 6 is programmed to close the valve 4 automatically. The predetermined time interval may be a pre-programmed threshold or may be a time threshold input into the controller 6 by the operator of the water supply system. Subsequent clockwise rotation of the tap handle 10 has no effect on the controller 6 or the valve 4 as the valve is already closed.

Those components of the water supply system which are exposed to the water flowing through to the spout 12 are preferably manufactured in drinking water compliant materials such as, but not limited to, brass and plastics.

In the preferred embodiment illustrated in FIG. 1, the valve actuator 5 is in communication with the controller 6 and the valve 4 is actuated by the controller 5. This ensures that the controller 6 is able to monitor usage of the tap and provide reliable data on the regularity and the timing of when the tap is used. Such usage tracking is particularly important in a care home environment as it provides corroborative evidence that necessary regular cleaning is taking place.

Indirect actuation of the valve 4 via the controller 6 also enables the controller 6 to intervene where unusual activity/usage of the tap is detected. For example, unusual activity might involve a user turning on the tap repeatedly in a short period of time. As the controller 6 is programmed to record data relating to how often the tap is used, that data may be used to identify unusual activity. Where unusual activity is detected, the controller 6 may be programmed to apply a time-out to further actuation of the valve 4 for a predetermined time period. For example, following the identification of unusual activity, the controller 6 may deactivate the valve 4 for a period of time such as 30 minutes or more. Similarly, unusual activity may involve inadequate use of the water facilities. Here too, irregular or very limited use of the tap detected by the controller 6 can result in an alarm being generated by the controller 6 or, for example, the requirement for a cleansing purge of the basin.

In order to minimize any delay between the turning of the tap and actuation of the valve 4, ideally the controller 6 is mounted physically close to both the valve 4 and the valve actuator 5 and employs wired communication. However, even where the controller 6 is physically distant from the valve 4 and the valve actuator 5, the speed of communication between the various components ensures that any delay is substantially unnoticeable.

In an alternative embodiment it is envisaged that the valve actuator 5 may be connected directly to and thereby directly control opening and closing of the valve 4. In this alternative embodiment the valve actuator 5 includes a parallel communication line to the controller 6 to ensure that the controller 6 is able to monitor usage, as discussed above and the valve has parallel control lines with both the valve actuator 5 and the controller 6. In this way the controller 6 retains the ability to trigger opening of the valve where, for example, a cleansing purge is required and the controller 6 retains the ability to close the valve after a predetermined period of time where a user forgets to turn the tap off after use.

In a further alternative embodiment the mechanical linkage between the tap handle 10 and the valve actuator 5 is replaced by an electronic rotation detector. For example, the electronic rotation detector may include a rotary encoder capable of detecting both rotary movement of the tap handle and the direction of rotation. Information from the rotary encoder is then communicated to the controller 6 to trigger the opening and closing of the valve 4. Where rotation of the tap handle 10 is detected electronically, either the tap handle 10 or the electronic rotation detector includes a mechanical stop to limit clockwise rotation of the tap handle 10. Other methods of detecting movement of the tap handle and the direction of rotation of the handle are envisaged, for example a potentiometer system.

As mentioned earlier, the water supply system described above is adapted for retro-fitting to existing taps. Installation of the water supply system to an existing tap is simple and easy and involves the following steps (the order of the steps listed below is to be understood to be immaterial):
1) removal of the original mechanical valve within the tap casing 11;
2) attachment of the upper end of the drive rod 16 to the tap handle 10;
3) installation of a T-junction water inlet 15 to the water pipework feeding the tap 2;
4) installation of the solenoid valve 4 to the water supply pipework supplying the T-junction water inlet 15;
5) connection of the valve actuator 5 to the lower end of the drive rod 16; and
6) connection of the controller 6 to the solenoid valve 4 and to the micro-switches 26, 27 of the valve actuator 5.

Figure 5:
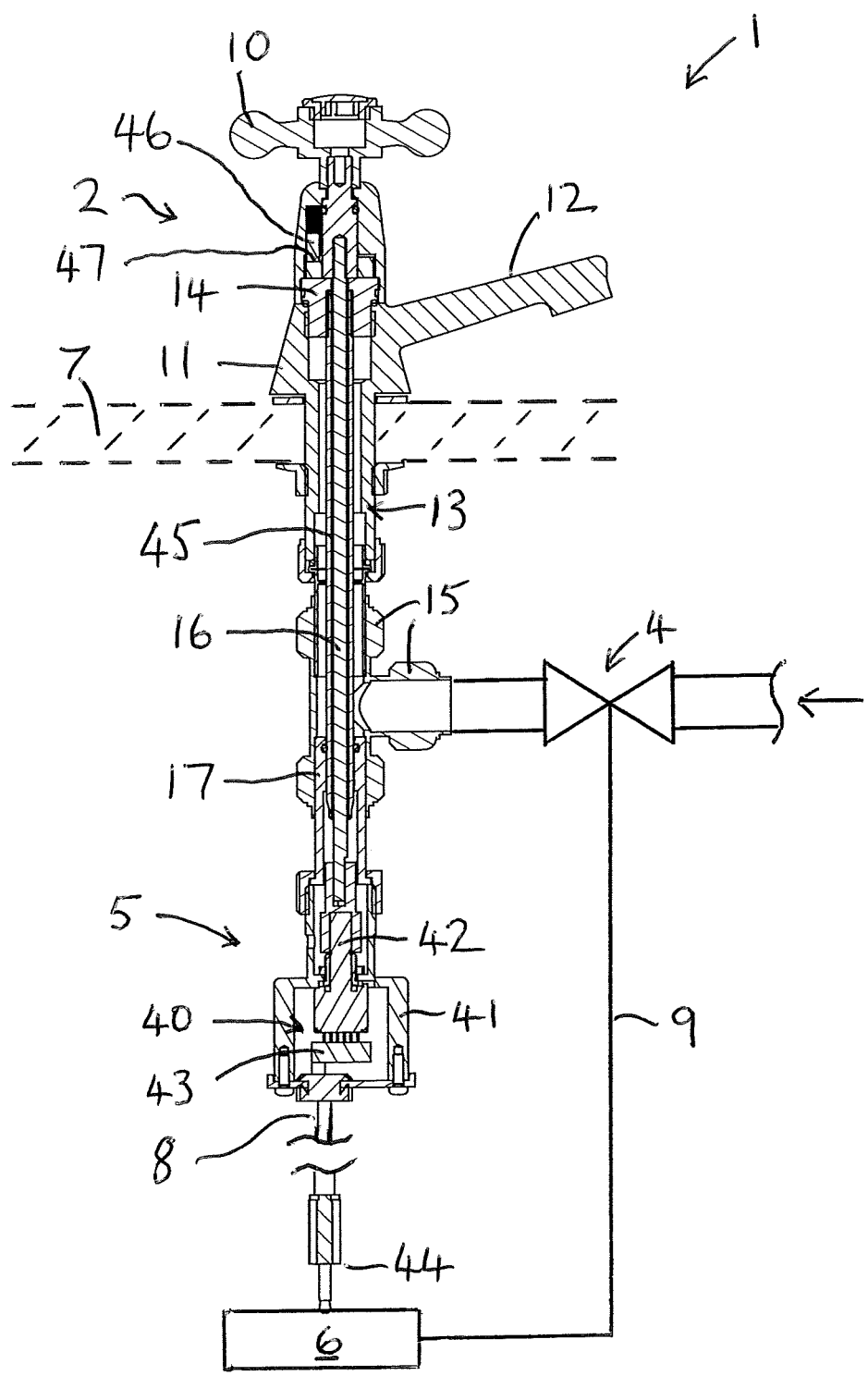
FIG. 5 is a schematic diagram similar to FIG. 1 of a water supply system in accordance with another embodiment of the present invention, including a cross-sectional view of the tap and the valve actuator of the water supply system.

FIG. 5 shows an alternative water supply system 1 that is similar in many respects to the water supply system 1 that is shown in FIG. 1 and like components have therefore been given like reference numerals. The FIG. 5 arrangement functions in a manner that is similar to the FIG. 1 arrangement but the construction differs in some details.

In FIG. 5, the valve actuator 5 incorporates an electronic encoder 40 provided in a cavity in an encoder housing 41. The encoder 40 is one optional alternative to the micro-switch 26, 27/rocker 22 arrangement shown in FIGS. 1 to 4. The lower end of the drive rod 16 is connected to a rotating part 42 of the encoder 40 and a stationery part 43 of the encoder is secured within the housing 41 and is connected to the controller 6, for example by means of a jack plug 44. Rotation of the drive rod 16 is therefore converted into a signal acted upon by the controller 6 in a conventional manner associated with encoders. As with the first embodiment, a detent or stop arrangement is provided to restrict rotation of the tap handle when the tap handle has been moved to its closed position. The stop/detent arrangement in the FIG. 5 embodiment is provided by a spring-loaded pin 46 cooperating with a cam surface 47 which rotates with the drive rod 16 and which has a detent face. Other detent arrangements are, however, possible.

In the FIG. 5 arrangement there is a spindle arrangement comprising the drive rod 16 extending internally of a watertight spindle tube 45, the drive rod 16 being able to rotate about its lengthwise axis within the tube 45. The tube 45 may in some arrangements be made of brass but other materials would be suitable such as some other metals or plastic. In the FIG. 5 embodiment it is the tube 45 part of the spindle arrangement that is exposed to water during use due to the tube 45 being disposed in the water supply pipework. The inside of the tube 45 in which the drive rod 16 is located remains dry whilst water flowing within the water supply pipework/conduit 3 flows around and past the outside surface of the tube 45.

As with the embodiment in FIG. 1, second plug 17 seals off the fluid path below the T-junction water inlet 15 between a lower end of the tube 45 of the spindle arrangement and the T-junction water inlet 15. The lower end of the drive rod 16 extends to its connection with the encoder 40 and is isolated from water flowing within the water conduit, the interior of the encoder housing 41 also being isolated from the water.

Similarly, the first plug 14 is mounted within the top casing 11 to isolate the handle 10 from water flowing through the tap to the spout 12. The first plug 14 seals between an upper end of the tube 45 of the spindle arrangement and the tap casing 11 whilst the upper end of the drive rod 16 extends to its connection with the handle 10. The drive rod 16 remains dry throughout and an intermediate portion of the tube 45 between its upper and lower ends is exposed to water in the water supply pipework.

Although the above description focuses on the use of the water supply system in care homes and similar facilities, the water supply system is also suitable for use domestically where a member of a family with dementia or other impairment of their mental processes is being cared for in their home environment. As the water supply system is easily retro-fitted to existing taps, the cost of installation in the home environment is much lower than known water supply control systems. However installation of the water supply system at home provides home carers with the reassurance that the risk of damage to the home as a result of accidental flooding is minimized. Domestic versions may not require complex electronic control functions but would still utilize the essential control and operational features discussed earlier.

One advantage of the water supply system described above is that electrical power is kept physically isolated from the water conduit and from the region above the basin where water may be splashed. Thus, all of the electrical components and connections are located below both the water conduit and the basin. Moreover, all wiring is hidden from the user.

With the water supply system described herein, a user is able to turn the tap on and off as normal and ideally the tap is the same as or at least similar in look and feel to the type of taps which the user is familiar. In particular with the water supply system described herein the user experiences the same restriction to continued closing rotation of the tap. Familiarity in look and feel of environments and the utilities in those environments, such as water utilities, is particularly important for people suffering from dementia or other impairment of their mental processes. Such familiarity endows people suffering from dementia or other impairment of their mental processes with a greater degree of confidence when using water utilities and enables them to retain some degree of independence in the use of water utilities.

It is to be understood that the water supply system described above are only two embodiments of the water supply system of the present invention. Changes may be made to the components and the arrangement of those components without departing from the scope of the invention as defined in the appended claims.

The invention claimed is:

1. A water supply control system for use with a water tap, the water supply control system comprising:
a spindle arrangement adapted for exposure to water during use, the spindle arrangement incorporating a spindle having a first end, a second end and a portion intermediate the first and second ends, the first end region of the spindle being adapted for rotation with a water tap handle and including means for connection to the handle of a water tap;
a tap rotation detector adapted to identify the direction of rotation of the spindle remote from said first end region;
a valve adapted to control the flow of water to the water tap; and
a controller in communication with the tap rotation detector and the valve, wherein the controller is adapted to trigger closure of the valve when the valve has remained open for a predetermined time interval,
the water supply control system further comprising a detent adapted to limit rotation of the spindle in a tap closing direction.

2. A water supply control system as claimed in claim 1, wherein the spindle arrangement extends through a portion of a supply conduit which supplies water to the tap.

3. A water supply control system as claimed in claim 1 wherein the spindle arrangement comprises a spindle tube inside which the spindle extends, it being the spindle tube that is adapted for exposure to water during use.

4. A water supply control system as claimed in claim 1, further including first and second plugs adapted for engagement with first and second ends of the spindle arrangement for isolating the first and second ends of the spindle from exposure to water.

5. A water supply control system as claimed in claim 1, wherein the tap rotation detector includes one or more movable contacts and the second end of the spindle includes a cam which acts upon the one or more movable contacts.

6. A water supply control system as claimed in claim 5, further comprising two or more contact sensors each of which detects contact with at least one of the one or more movable contacts.

7. A water supply control system as claimed in claim 6, wherein each contact sensor is a micro-switch.

8. A water supply control system as claimed in claim 1, wherein the tap rotation detector includes a rotary encoder for identifying the direction of rotation of the spindle.

9. A water supply control system as claimed in claim 1, wherein the controller is further adapted to trigger the opening of the valve for a cleansing purge independently of any detected rotation of the tap.

10. A water supply system including a water supply control system as claimed in claim 1, a tap and a basin, sink, bath or shower.

11. A water supply system as claimed in claim 10 wherein the tap rotation detector is mounted below the surface of the basin, sink, bath or shower on which the tap is mounted.

12. A method of installing a water supply control system as claimed in claim 1 to the tap of an existing water utility, the method comprising the steps of:
   a. removing the mechanical valve in the tap of the existing water utility;
   b. attaching a first end of the spindle of the water supply control system to a handle of the tap;
   c. positioning the spindle arrangement within pipework which supplies water to the tap;
   d. positioning the tap rotation detector below the surface of the water utility on which the tap is mounted so as to detect the direction of rotation of a portion of the spindle remote from its first end; and
   e. installing the valve in pipework which supplies water to the existing water utility such that there is an open water circuit between the valve and an outlet of the tap.

\* \* \* \* \*